United States Patent
Edgar, III et al.

(10) Patent No.: US 6,731,748 B1
(45) Date of Patent: *May 4, 2004

(54) AUDIO INTERFACE FOR SATELLITE USER TERMINALS

(75) Inventors: Clement B. Edgar, III, San Diego, CA (US); Ivan Oei, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/201,700

(22) Filed: Nov. 30, 1998

(51) Int. Cl.[7] .................. H04M 9/00; H04M 1/60; H04B 3/58; H04Q 7/20; H04Q 7/32

(52) U.S. Cl. .................. 379/387; 379/388; 379/392; 379/397; 379/340; 379/27; 379/395; 455/554; 455/555; 455/420

(58) Field of Search .................. 379/27, 177–187, 379/219–241, 250, 442–444, 307; 370/225, 320, 352, 353; 455/551–558, 432, 3.01–3.06, 465, 507, 514, 186.1, 67.1

(56) References Cited

U.S. PATENT DOCUMENTS

| | | | | |
|---|---|---|---|---|
| 4,206,318 A | * | 6/1980 | Steely | |
| 4,283,604 A | * | 8/1981 | Chambers | 179/70 |
| 4,567,332 A | | 1/1986 | Jamison | |
| 5,036,536 A | * | 7/1991 | Hannon et al. | 379/387 |
| 5,553,126 A | * | 9/1996 | Tang | |
| 5,581,579 A | * | 12/1996 | Lin et al. | 375/331 |
| 5,633,920 A | * | 5/1997 | Kikinis et al. | 379/130 |
| 5,677,942 A | * | 10/1997 | Meier | 379/58 |
| 5,691,718 A | * | 11/1997 | Balatoni et al. | |
| 5,692,042 A | * | 11/1997 | Sacca | 379/387 |
| 5,732,360 A | * | 3/1998 | Jarett et al. | 455/552 |
| 5,822,426 A | * | 10/1998 | Rasmus et al. | 379/402 |
| 5,892,823 A | * | 4/1999 | Stelman | 379/387 |
| 5,995,849 A | * | 11/1999 | Williams et al. | 455/555 |
| 5,999,828 A | * | 12/1999 | Sih et al. | |
| 6,044,268 A | * | 3/2000 | Haartsen | 455/426 |
| 6,125,139 A | * | 9/2000 | Hendrickson et al. | 375/220 |
| 6,141,531 A | * | 10/2000 | Williams et al. | 455/555 |

FOREIGN PATENT DOCUMENTS

| | | | | |
|---|---|---|---|---|
| EP | 0546 571 B1 | * | 12/1997 | H03F/3/181 |
| JP | 59151557 | | 8/1984 | |
| JP | 59178054 | | 10/1984 | |
| WO | 9818238 | | 4/1998 | |

* cited by examiner

Primary Examiner—Forester W. Isen
Assistant Examiner—Ramnandan Singh
(74) Attorney, Agent, or Firm—Philip R. Wadsworth; Gregory D. Ogrod; Jae-Hee Choi

(57) ABSTRACT

An apparatus, system, and method for providing an audio interface between multiple deskset phones and a single radio antenna unit (RAU). The audio interface includes a transmit path and a receive path. The transmit path carries transmit signals from the multiple deskset phones to the RAU. The receive path carries a receive signal from the RAU to the deskset phones. The transmit path and receive path are electrically isolated from each other.

30 Claims, 10 Drawing Sheets

FIG. 6: AUDIO INTERFACE RECEIVE PATH

TRANSMIT PATH OPERATIONS

RECEIVE PATH OPERATIONS

IDEAL SUMMING AMPLIFIER

TRANSMIT SUMMING AMPLIFIER
IN PRESENT INVENTION

AUDIO INTERFACE FOR SATELLITE USER TERMINALS

RELATED APPLICATION

This application is related to a commonly owned U.S. patent application, filed on even date herewith, entitled "Ringer for Satellite User Terminals," having Ser. No. 09/201,520, which is incorporated herein by reference.

BACKGROUND OF THE INVENTION

I. Field of the Invention

The present invention relates generally to satellite communication systems, and more particularly, to an apparatus, system, and method for providing an audio interface between multiple deskset phones and a radio transceiver unit.

II. Description of the Related Art

A variety of multiple access communication systems and techniques have been developed for transferring information among a large number of system users. However, spread spectrum modulation techniques, such as code division multiple access (CDMA) spread spectrum techniques, provide significant advantages over other modulation schemes, especially when providing service for a large number of communication system users. The use of CDMA techniques in multiple access communication systems is disclosed in U.S. Pat. No. 4,901,307, which issued Feb. 13, 1990, entitled Spread Spectrum Multiple Access Communication System Using Satellite Or Terrestrial Repeaters, and U.S. Pat. 5,691,974, which issued Nov. 25, 1997, entitled Method And Apparatus For Using Full Spectrum Transmitted Power In A Spread Spectrum Communication System For Tracking Individual Recipient Phase Time And Energy, both of which are assigned to the assignee of the present invention, and incorporated herein by reference. CDMA uses a preselected pseudonoise (PN) code sequence to modulate and spread a digital message over a predetermined spectral band, prior to modulation of the carrier signal. The same PN code is used to recover the original digital message at the destination.

The above referenced patents disclose communication systems in which a large number of generally mobile or remote system users employ mobile stations or subscriber units ("user terminals") having at least one transceiver to communicate with other user terminals, or users of other connected systems, such as a public telephone switching network. Communication signals are transferred either through satellites and gateways, or directly to terrestrial base stations (also sometimes referred to as cell-sites or cells).

One type of remote user is a fixed unit, such as a wireless phone, facsimile device, and so forth, in a remote location where wirelines are impractical, such as an offshore oil rig or other remote geographical location. Such remote locations often require that multiple phones be serviced by a single access channel or communication link from a satellite in a "party line" type of service. A party line is a single communications path or link that is used as a shared resource. The defining feature of party line service is that a telephone call can be answered or initiated by a user at one party line phone, and all other party line phones can participate in the telephone call. But, an additional telephone call by a non-participating phone cannot be effected until the first call is terminated.

An exemplary situation would be a telephone call between workers on an offshore oil rig and land-based vendor technicians, where the purpose is to solve a technical problem. It would be advantageous for workers at multiple locations on the oil rig to be able to simultaneously participate in the telephone call. A party line, generally having a single access, address, code, or telephone number, can meet this need.

Another situation in which multiple phones may be required is in a remote geographical land location where it is not cost effective to run standard telephone lines, including mid-desert locations, small island locations, rural-third world locations, and the like. In those cases, a community building having multiple rooms might be setup with phones in each room. Another example would be a remotely located multi-family dwelling, where each family would want to have a phone. In many of these cases, it would not be cost effective to install separate satellite receiving equipment for maintaining separate communications links for each phone. In each of these cases, a party line arrangement would provide a cost effective method of maintaining efficient telephone communication links.

A remote location with party line service can be efficiently linked to a satellite communications system through a radio antenna unit (RAU). An RAU is a transceiver, comprising well known elements, that transmits and receives a modulated carrier signal to and from the satellite communications system through an antenna. During transmission, the RAU accepts audio signals from multiple phones. An audio coder-decoder (or audio codec) in the RAU digitizes the audio signals, which are then used to modulate the carrier signal that is radiated to a satellite (or other relay apparatus) by the antenna. During reception, the RAU receives an input signal comprising a modulated carrier signal from a satellite. The RAU demodulates the input signal to retrieve the digital audio signal. After which, the audio codec converts the digital audio signal to an analog audio signal, and causes the analog audio signal to be sent to the multiple phones. The RAU can use a variety of additional signal processing and control elements as desired, and known in the art.

When the audio signals are primarily composed of human speech, a vocoder may be used to compress (de-compress) the digital bit stream before the carrier signal is modulated (de-modulated) to make more efficient use of the carrier signal bandwidth. The vocoder operates on the principle that speech sounds can be predicted and extrapolated based on the analysis of a small portion of a sound. Thus, the vocoder removes selected bits from the digital bit stream before carrier modulation, and adds them back before de-modulation. Vocoders are especially useful in wireless communications systems where multiple subscribers are competing for limited carrier bandwidth.

The above described communications system requires an audio interface to carry the electrical audio signals between the multiple phones and the RAU.

A conventional audio interface for a POTS (Plain Old Telephone Service) system is full duplex, meaning outgoing transmit signals and incoming receive signals are both carried on the same cable simultaneously. However, both the vocoder and the audio codec require that the transmit and receive signals be separated for proper operation. A POTS system utilizes a hybrid transformer located at either the telephone switching office or in the phone handset to separate the transmit and receive signals.

Interactions between the hybrid transformer, and vocoder or audio codec result in an echo signal that is reflected back to the phone user. Loud echo signals degrade reception quality and are generally unacceptable. A conventional POTS system implements elaborate echo cancellation circuitry at the telephone switching office to suppress or attenuate the echo signal so that it is not reflected back to the phone user. The echo cancellation circuitry is expensive, but since a typical POTS telephone office serves a large number of users, the expense is justified.

The conventional POTS audio interface is an inappropriate choice for a remote location served by a single RAU because it would require the installation of the echo cancellation circuitry at the RAU. Although the RAU supports multiple phones, the number of phones is typically insufficient to justify the expense of the echo cancellation circuitry. What is needed is an audio interface between multiple phones and a single RAU that does not require the use of echo cancellation circuitry.

SUMMARY OF THE INVENTION

The present invention is directed toward an apparatus, system, and method for providing an audio interface between a deskset phone at a first location and an audio codec at a second location. In one embodiment the audio codec is a leading component in a radio antenna unit (RAU).

The audio interface comprises a transmit path comprising a 2-wire transmit cable for carrying a transmit signal from the first location to the second location, and a receive path comprising a 2-wire receive cable for carrying a receive signal from the second location to the first location. The transmit and receive paths are electrically isolated from each other, except that the receive signal contains an intentional sidetone that is derived from the transmit signal. In one embodiment, the transmit and receive cables are twisted together to further the goal of electrical isolation.

In one embodiment, the transmit path further comprises a bias circuit that biases a microphone at the first location with a floating point ground causing the transmit signal to be a differential signal. The bias circuit also converts any single mode power supply noise to common mode noise. A first amplifier, configured with a differential input and output, amplifies the transmit signal to drive the transmit cable. Since the first amplifier has a differential input, it rejects any common mode noise added to the transmit signal by the microphone bias circuit. A transformer attached to the transmit cable at the RAU location rejects any common mode noise generated by the transmit cable, but passes the transmit signal.

In an alternate embodiment, the audio interface provides an interface between multiple deskset phones and the audio codec. A summing amplifier combines multiple transmit signals from multiple deskset phones to form a combined transmit signal. The summing amplifier comprises: the transmit cable for summing currents of the multiple transmit signals; an amplifier for amplifying the combined transmit signal; and a multiple series resistors that correspond to the multiple desksets. The value of the series resistors determines the relative weighting of each transmit signal in the combined transmit signal.

In one embodiment, the receive path further comprises a summing amplifier. The receive summing amplifier combines a primary receive signal and a sidetone signal to form the receive signal, and amplifies the receive signal. A transformer attached to the receive cable at the deskset location rejects any common mode noise picked up by the receive cable, but passes the receive signal.

In an alternate embodiment, DC power is generated at the RAU location and carried by the transmit and receive cables to the deskset locations. Transformers attached to both ends of the transmit and receive cables isolate individual power supply voltages from the audio circuitry at the deskset and the RAU locations.

One main advantage of the present invention is that it allows for the cost effective installation and operation of multi-party telephone and data communications services in remote locations where standard telephone communications lines cannot be installed at a reasonable cost.

A second advantage of the present invention is that the audio interface contains a transmit cable and a receive cable. The transmit cable is dedicated to carrying transmit signals and is electrically isolated from the receive cable that is dedicated to carrying receive signals. This results in cost saving and reduced system complexity over a conventional POTS audio interface.

A conventional POTS interface requires a hybrid transformer to separate the transmit and receive signals prior to the audio codec because the transmit and receive signals are carried on the same cable simultaneously. Furthermore, a conventional POTS interface requires expensive echo cancellation circuitry to cancel the echo signal caused by the hybrid transformer. The present invention does not require a hybrid transformer or the echo cancellation circuitry because the present invention utilizes separate cables for the transmit and receive signals.

A third advantage of the present invention is that the components in the transmit and receive paths are configured to operate on differential signals, and reject any common mode signals. This is advantageous for reflecting common mode noise that can saturate audio components if unchecked. The transmit and receive cables are large potential sources of common mode noise, where the noise power generated increases with cable length. The present invention utilizes audio transformers attached to the ends of the transmit and receive cables to reject any common mode noise generated by the cables.

A fourth advantage is the use of a microphone bias circuit that converts single mode power supply noise to common mode noise that is imposed on the differential transmit signal. As discussed above, the common mode noise is then rejected by following audio components because they are configured to operate on differential signals only.

A fifth advantage of the present invention is that the transmit and receive cables can be utilized to carry DC power generated at the RAU location to the deskset phones. Thus, one DC supply can power the RAU and deskset components, without the need to run a separate set of power cables between the different locations. Audio transformers attached to the ends of the transmit and receive cables prevent the cable voltage from affecting the attached audio circuitry.

BRIEF DESCRIPTION OF THE FIGURES

The features, objects, and advantages of the present invention will become more apparent from the detailed description set forth below when taken in conjunction with the figures in which like reference characters identify correspondingly throughout, and wherein.

DETAILED DESCRIPTION OF THE PREFERRED EMBODIMENTS

I. Introduction

The present invention is particularly suited for use in communications systems employing low earth orbit (LEO) satellites. The invention is also applicable to satellite systems in which the satellites travel in non-LEO orbits, or to non-satellite communications systems.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including satellite and terrestrial cellular telephone systems. A preferred application is in CDMA wireless spread spectrum communication systems for telephone service.

II. A Typical Satellite Communications System

Figure 1:
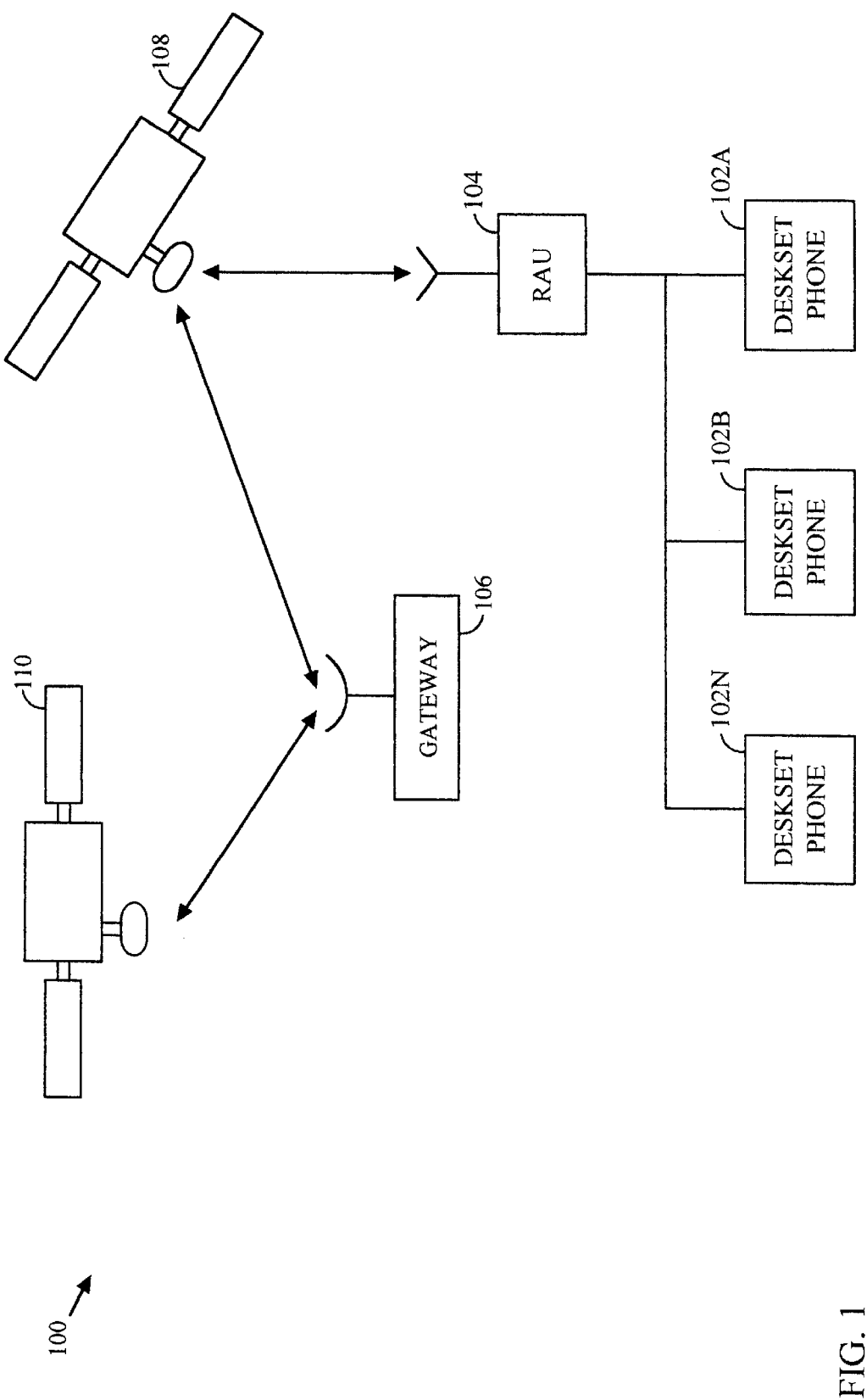
FIG. 1 illustrates an exemplary wireless communications system in which the present invention is useful.

An exemplary wireless communication system in which the present invention is useful is illustrated in FIG. 1. It is contemplated that this communication system uses CDMA type communication signals, but this is not required by the present invention. In a portion of communications system 100 illustrated in FIG. 1, deskset phones 102a–n communicate through a single radio antenna unit (RAU) 104 with a gateway 106 using satellites 108 and 111. The total number of satellites and gateways in such systems depend on desired system capacity and other factors well understood in the art.

RAU 104 transmits and receives modulated signals to and from satellite 108 through at least one antenna. The modulated signals carry communications (including telephone conversation) to and from desksets 102a–n. In one embodiment, RAU 104 implements well known CDMA spread spectrum techniques to optimize system bandwidth. CDMA uses a preselected pseudonoise (PN) code sequence to modulate and spread a digital signal over a predetermined spectral band. A corresponding method is used to recover the digital signal at the destination. RAU 104 will be discussed in more detail in following sections.

The primary function of deskset phones 102a–n (or "desksets") is to allow deskset users to place and receive wireless telephone calls through communications system 100. Typically, desksets 102a–n would be located in various rooms of a building, or different dwellings in a small community. The key aspect is that each of the desksets are connected in common to RAU 104.

FIG. 1 illustrates desksets 102a–n providing "party-line" service, meaning that desksets 102a–n are connected to and share a single communications link to RAU 104, which is commonly referred to as a telephone line. In one embodiment, up to 8 desksets can share a single telephone line. A feature of party line service is that deskset 102a can answer or initiate a telephone call to a third party and desksets 102b–n can simultaneously participate in the telephone call. But desksets 102b–n cannot simultaneously establish additional telephone calls to other parties until the first call has been terminated.

III. DETAILED INVENTION DESCRIPTION

Figure 2:
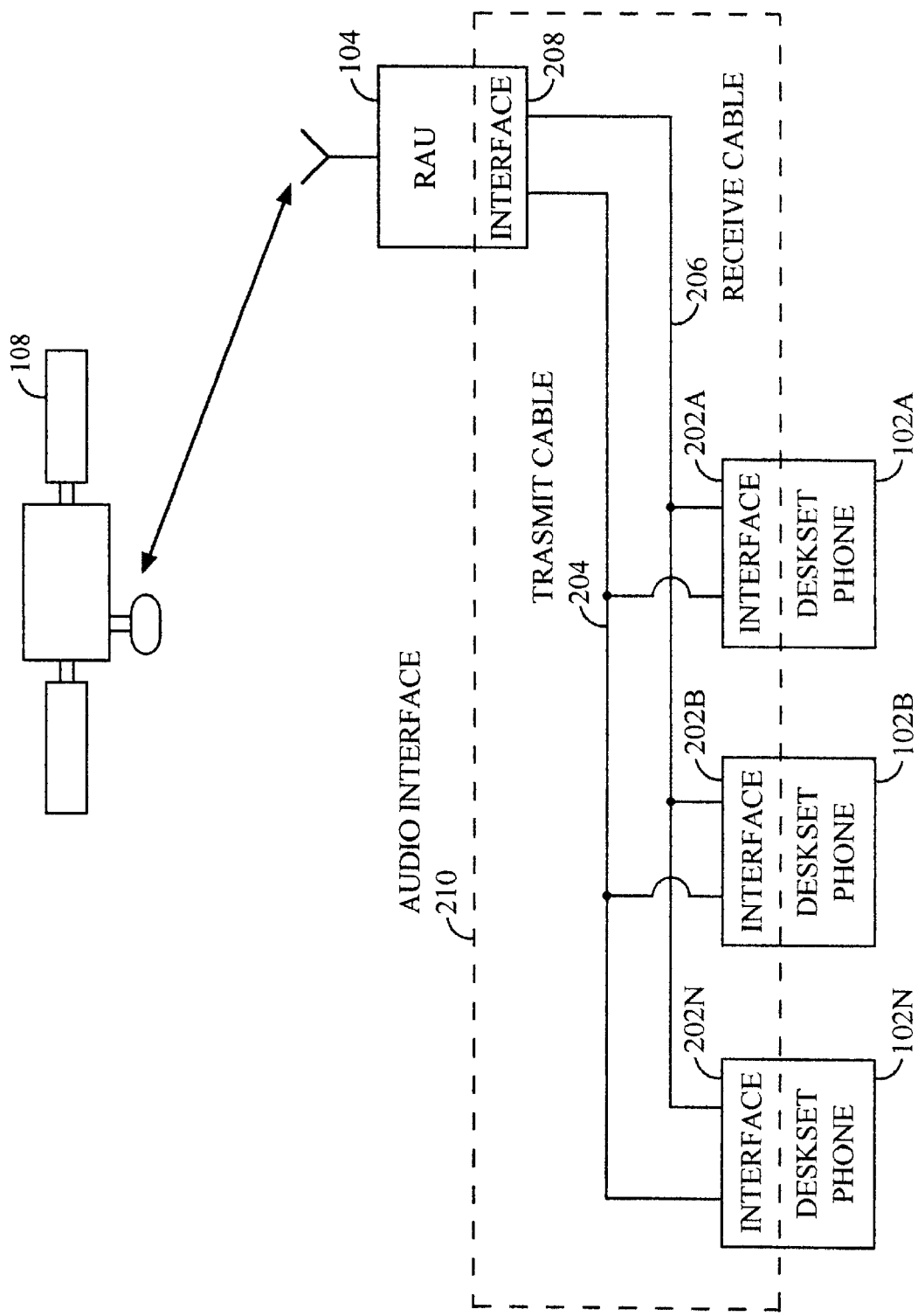
FIG. 2 illustrates an exemplary remote user.

FIG. 2 illustrates desksets 102a–n connected to RAU 104 in a party line configuration by audio interface 210. Deskset interfaces 202a–n, transmit cable 204, receive cable 206, and RAU interface 208 together comprise an audio interface 210.

Once a phone call is initiated, transmit cable 204 carries multiple transmit signals from deskset interfaces 202a–n to RAU interface 208. Transmit signals are audio signals generated from acoustic inputs at desksets 102a–n. Transmit cable 204 carries only transmit signals and is electrically isolated from receive cable 206. RAU 104 digitizes and modulates the transmit signals before relaying them to satellite 108.

Receive cable 206 carries a receive signal from RAU interface 208 to deskset interfaces 202a–n. The receive signal includes two components, a primary receive signal and a sidetone signal. RAU interface 208 combines the two components before sending the receive signal to deskset interfaces 202a–n. RAU 104 generates the primary receive signal from an input signal received from satellite 108. RAU 104 derives the sidetone signal from the transmit signal carried by transmit cable 204. The sidetone signal allows deskset users to hear their own voice(s) carried by the transmit signals in real-time. Therefore, the sidetone signal functions as audio feedback which most users find useful in carrying on a conversation, which is otherwise missing in this type of system.

The primary function of desksets 102a–n is to allow deskset users to place and receive wireless telephone calls through satellite system 100. Desksets 102a–n may also have additional features of voice mail, text mail, number storage, and call history that are displayed on a liquid crystal display (LCD). The user interface for desksets 102a–n is controlled by software running on a processor in RAU 104. RAU 104 sends commands and information over a control bus to desksets 102a–n, where the commands are displayed on the LCD display or used to control light emitting diodes (LEDs). An example command from RAU 104 would instruct deskset 102a–n to activate an LED that indicates a new voice mail message has been received.

Physically, desksets 102a–n may have a 12-key standard key pad, and buttons for send, clear, menu, information, mail, volume up, and volume down. Desksets 102a–n may have a four line LCD display with indicators for battery level, and signal strength. Other indicators may include phone-in-use, voice mail waiting, and text mail waiting. Desksets 102a–n may also have provisions for speaker phone capability, including buttons and LED indicators for speaker phone control. Those skilled in the art will recognize that other configurations and features for desksets 102a–n may be useful based on the discussion given herein.

Figure 3:
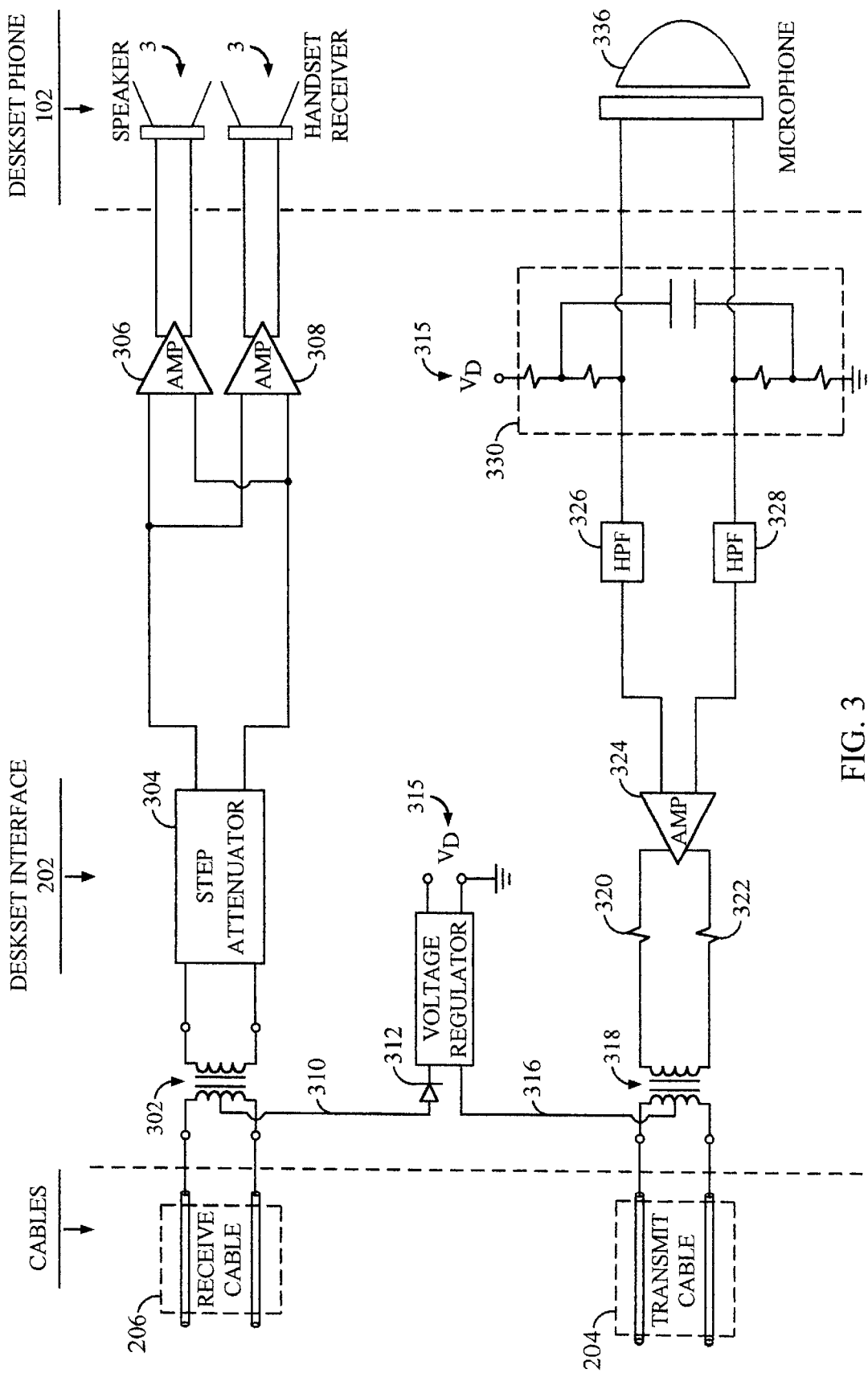
FIG. 3 is a block diagram depicting an example embodiment of a representative deskset interface arrangement according to the present invention.

FIG. 3 illustrates a block diagram of a representative deskset interface arrangement. The arrangement includes: transmit and receive cables 204 and 206, representative deskset interface 202, and representative deskset 102.

Figure 3B:
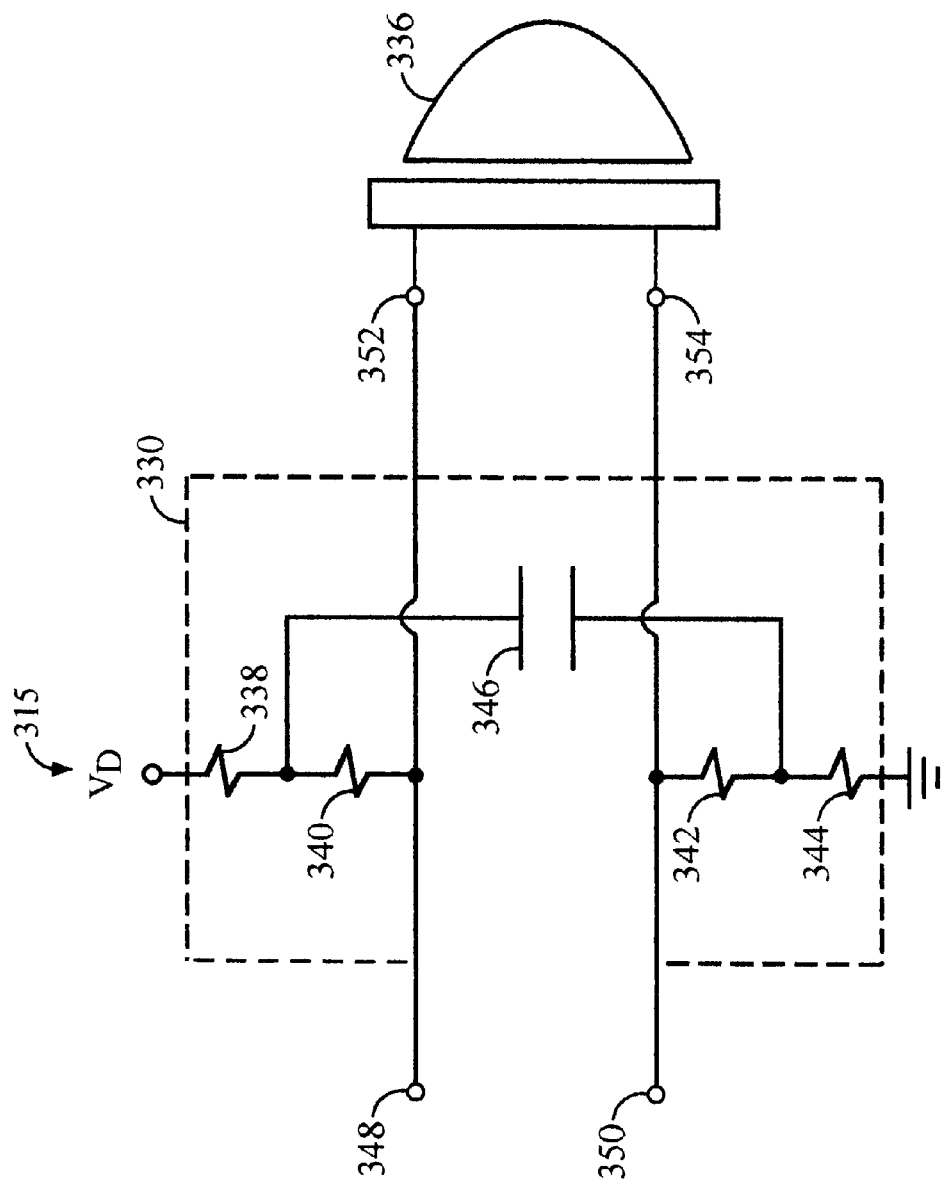
FIG. 3B is a diagram depicting an example embodiment of bias circuit 330.

Deskset interface 202 comprises: transformer 302; step attenuator 304; amplifiers 306, 308; supply line 310; diode 312; voltage regulator 315; supply line 316; transformer 318; resistors 320, 322; amplifier 324; high pass filters (HPF) 326, 328; and bias circuit 330. Deskset phone 102 comprises: speaker 332, handset receiver 334, and microphone 336. FIG. 3B illustrates bias circuit 330 comprising: resistors 338, 340, 342, and 344; capacitor 346; and terminals 348, 350, 352, and 354.

Illustrative components will be described below. In one embodiment, transformers 302 and 318 are 1:1 audio transformers with a unity gain passband from 200 Hz to 3400 Hz. Other transformer ratios and passbands are useful for other environments. For example, in an alternative embodiment, transformer 318 is configured as a 1:n transformer, with the secondary coil connected to transmit cable 204. This offers the potential for voltage gain through transformer 318 at the expense of a greater noise level.

In one embodiment, microphone 336 is encased in a resonant cavity that causes a resonance in the transmit signal at the high end of the audio spectrum. The resonance occurs at approximately 3 KHz with a quality factor of 10, and serves to pre-emphasize the frequency spectrum of the transmit signal. Pre-emphasis is desired to offset the effect of increasing signal attenuation with increasing frequency.

Resistors 340, 342 have a value substantially equal to 3.92 KOhms, and capacitor 346 has a value substantially equal to 100 $\mu$F. Resistors 338, 344 have a value substantially equal 1.2 KOhms. This combination of component values converts single mode noise with frequencies of 1.3 Hz and above to common mode noise at terminals 348, 350.

High pass filters 326, 328 are third order active filters based on operational amplifiers (op amps), such as the LM 2904 that is commercially available from National Semiconductor. The LM 2904 was chosen primarily or low cost. Active op amp filters provide a flat passband response down to 200 Hz, a sharp corner frequency at 200 Hz, and a faster rolloff below 200 Hz when compared to passive high pass filters. Implementations of such active op amp filters are well known to those skilled in the art.

Amplifier 324 is based on an op amp, such as the LM 4862 which is commercially available from National Semiconductor. The LM 4862 offers: sufficient output drive capability, low power dissipation, single supply operation, and a low cost. In one embodiment, amplifier 324 is configured for a total gain of approximately 19 dB over the audio range of interest. The 19 dB of gain is achieved using standard feedback techniques, and includes 6 dB of gain resulting from the use of a differential input and a differential output. The 19 dB gain value was chosen to maximize output voltage swing for a maximum acoustic input at microphone 336. As such, amplifier 324 can generate an output voltage swing of 2.8 V peak for a maximum expected acoustic input of 12 dB Pa peak.

It will be understood that deskset interface 202 and deskset 102 in FIG. 3 are representative of multiple deskset interfaces 202a–n and deskset 102a–n illustrated in FIG. 2. Thus, audio interface 210 comprises multiple sets of components illustrated in FIG. 3, except for transmit and receive cables 204, 206.

Figure 4:
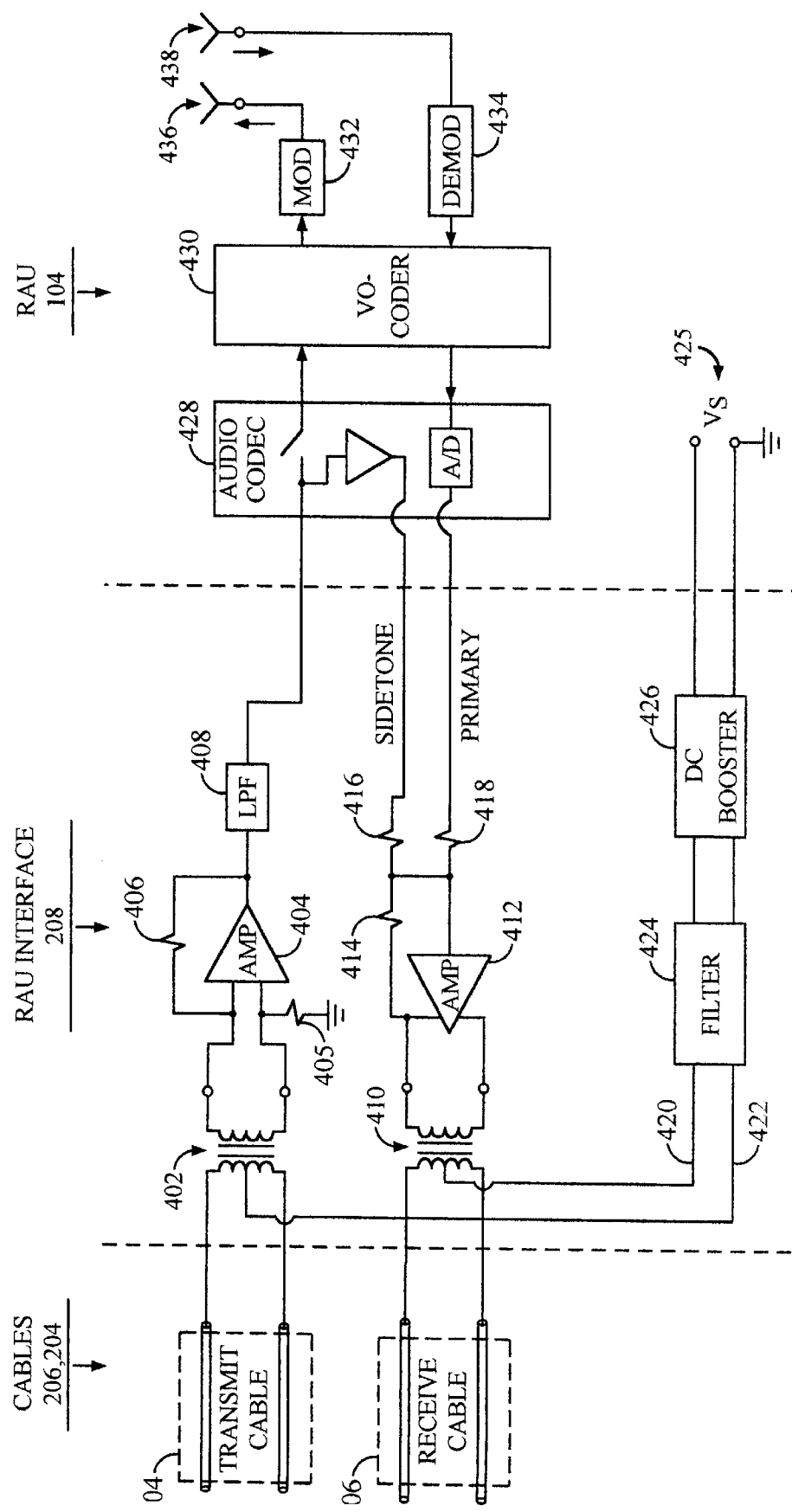
FIG. 4 is a block diagram depicting an example embodiment of the RAU interface arrangement according to the present invention.

FIG. 4 illustrates a block diagram of the RAU interface arrangement comprising: transmit and receive cables 204 and 206, RAU interface 208, and RAU 104. RAU interface 208 comprises: transformer 402; amplifier 404; resistors 405, 406; lowpass filter (LPF) 408; transformer 410; amplifier 412; resistors 414, 416, 418; supply lines 420, 422; filter 424; and DC booster 426. RAU 104 comprises: audio codec 428, vocoder 430, modulator 432, de-modulator 434, and antennas 436, 438.

In one embodiment, transformers 402 and 410 are 1:1 audio transformer with characteristics similar to transformers 302 and 318. In an alternative embodiment, transformer 410 is configured as a 1:n transformer, with the secondary coil connected to receive cable 206. This offers the potential for voltage gain through transformer 410 at the expense of greater noise levels.

Audio codec 428 is a processor that converts voice signals from analog to digital, and visa versa, and is generally commercially available. In one embodiment, the voice band analog processor (VBAP) from Texas Instruments (part # TLC 320A36) is used for audio codec 428. The TI VBAP is a mixed signal part that has both A/D and D/A functionality and is specifically tuned for digital telephony applications. It uses a 2.048 MHz master clock to drive conversion functions, and a 8 KHz frame sync to define the sampling frequency. In one embodiment, the digital input for the D/A function is configured as a serial stream of 16-bit digital words, where the last three bits are padded with zeroes. In an alternate embodiment, the TI VBAP can be configured to accept 8-bit words reflecting amplitude compression using one of linear, A-law, or MU-law compression.

Audio interface 210 may also be examined in terms of a transmit path and a receive path. The transmit path is defined as the signal path that transmit signals travel from microphone 330 through the audio interface 210 to RAU 104. The receive path is defined as the signal path that a receive signal travels from RAU 104 though audio interface 210 to speaker 332 and handset receiver 334.

Figure 5:
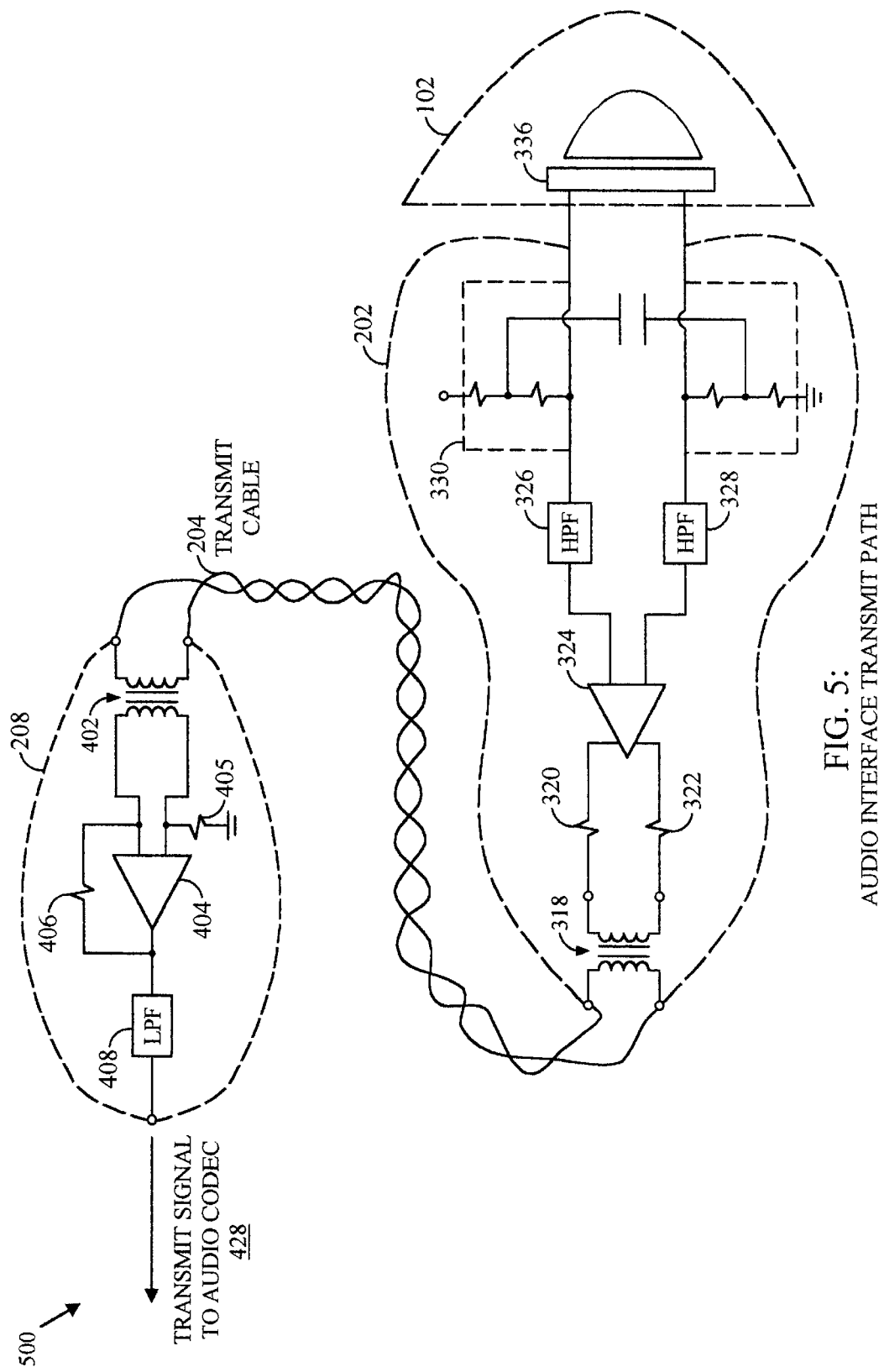
FIG. 5 is a block diagram depicting the transmit path of the audio interface.
Figure 6:
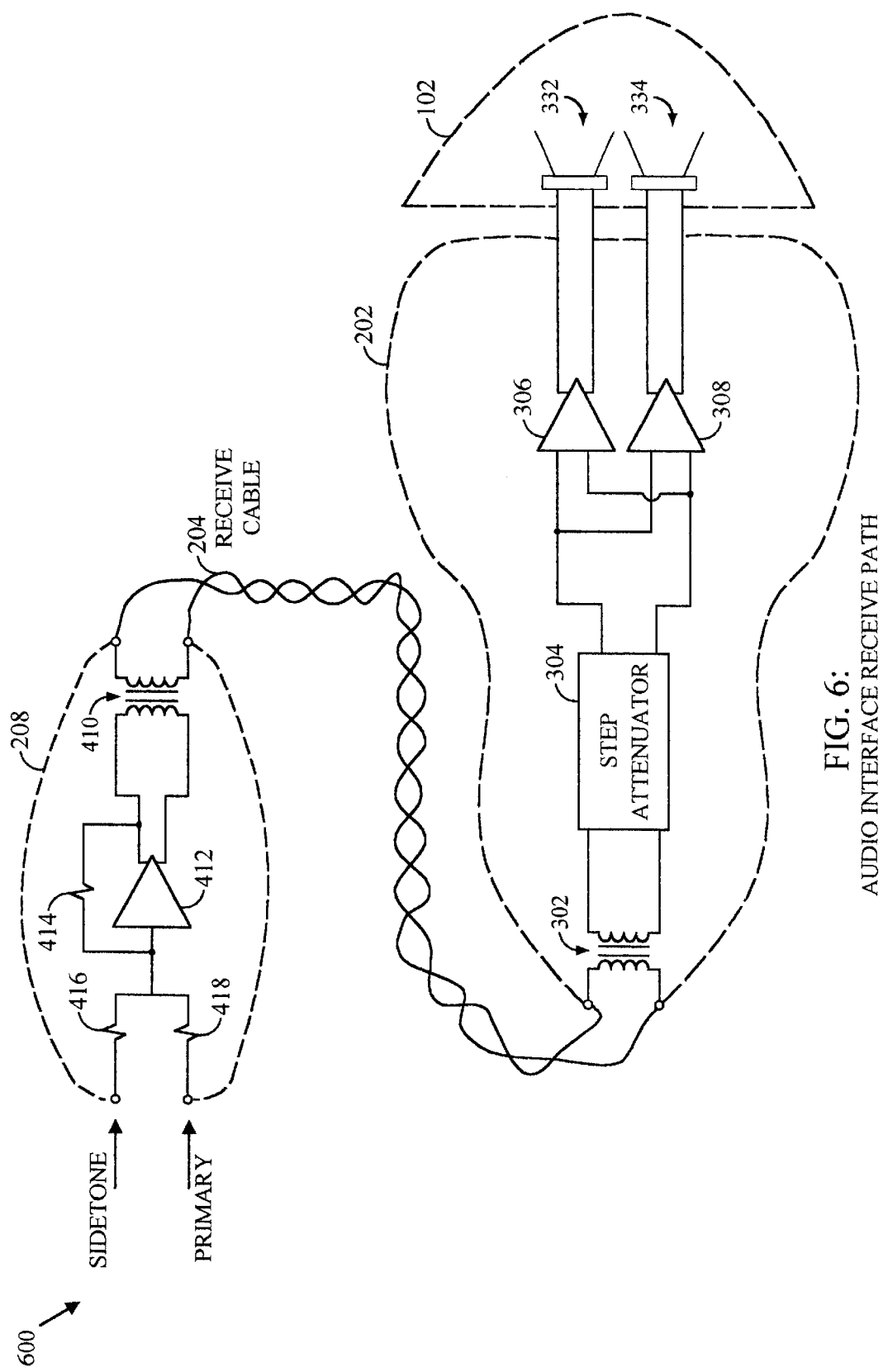
FIG. 6 is a block diagram depicting the receive path of the audio interface.

FIGS. 5 and 6 are block diagrams of transmit path 500 and receive path 600, respectively. For convenience, FIGS. 5 and 6 illustrate only one deskset interface 202 and deskset 102 connected to transmit and receive cables 204, 206. However, audio interface 210 is not limited to serving only one deskset, and those skilled in art will recognize that multiple desksets can be served by audio interface 210, as illustrated in FIG. 2.

In one embodiment, transmit cable 204 and receive cable 206 are both comprised of standard 2-wire twisted pair telephone cable as illustrated in FIGS. 5 and 6.

In an alternate embodiment, transmit cable 204 and receive cable 206 are both formed from standard 24 AWG 8-conductor twisted pair telephone cable with a maximum length of 1500 feet. In this embodiment, two of the eight conductors are reserved for transmit cable 204, two conductors for receive cable 206, two conductors for a control bus, and two conductors are used as backup power cables. The control bus cable and backup power cables are included for convenience of system assembly only, and are not necessary to practice the present audio interface invention.

The electrical isolation between the eight conductors is increased by twisting the eight conductors together. The improved isolation occurs because induction paths between multiple conductors are reduced when the conductors are twisted together as compared with an un-twisted configuration. Thus, electrical isolation between transmit path 500 and receive path 600 is increased by twisting together transmit and receive cables 204, 206.

In an alternate embodiment, transmit and receive cables 204, 206 are coaxial cables. Coaxial cables are shielded by definition, negating any need or benefit of twisting the cables together to improve isolation.

Figure 7:
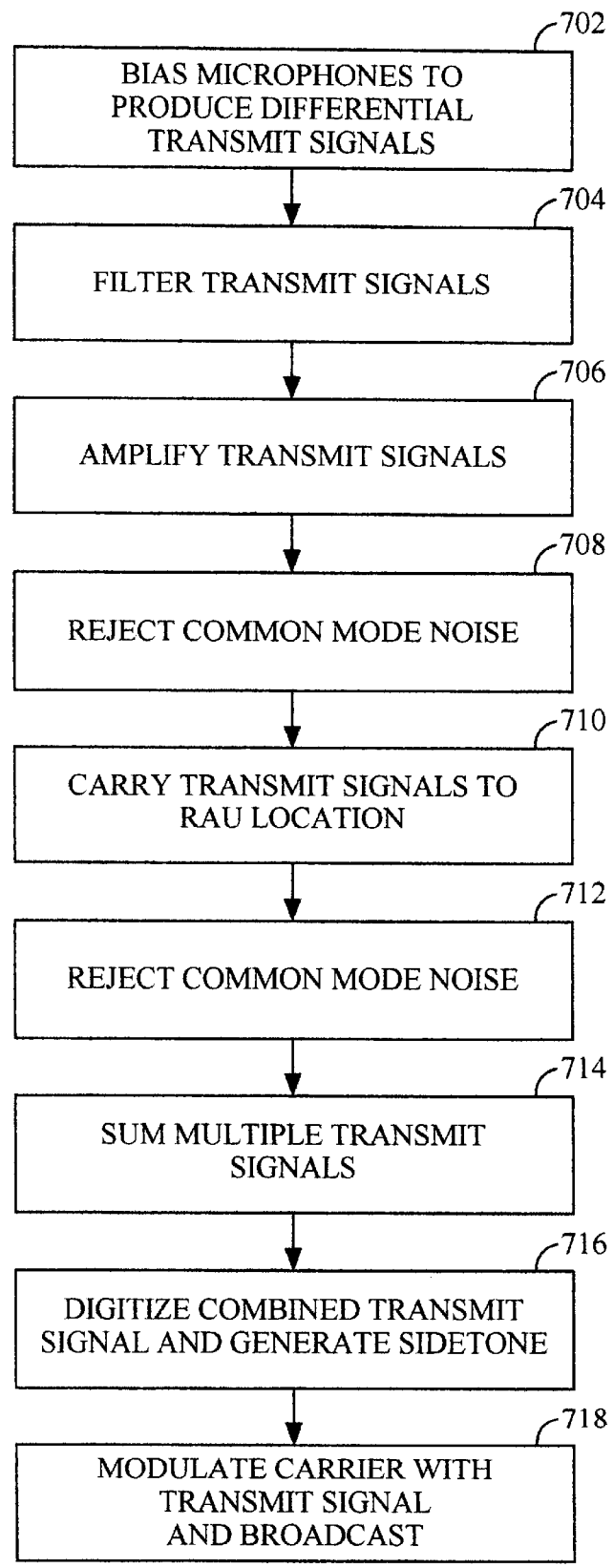
FIG. 7 is a flowchart of transmit path operations.
Figure 8:
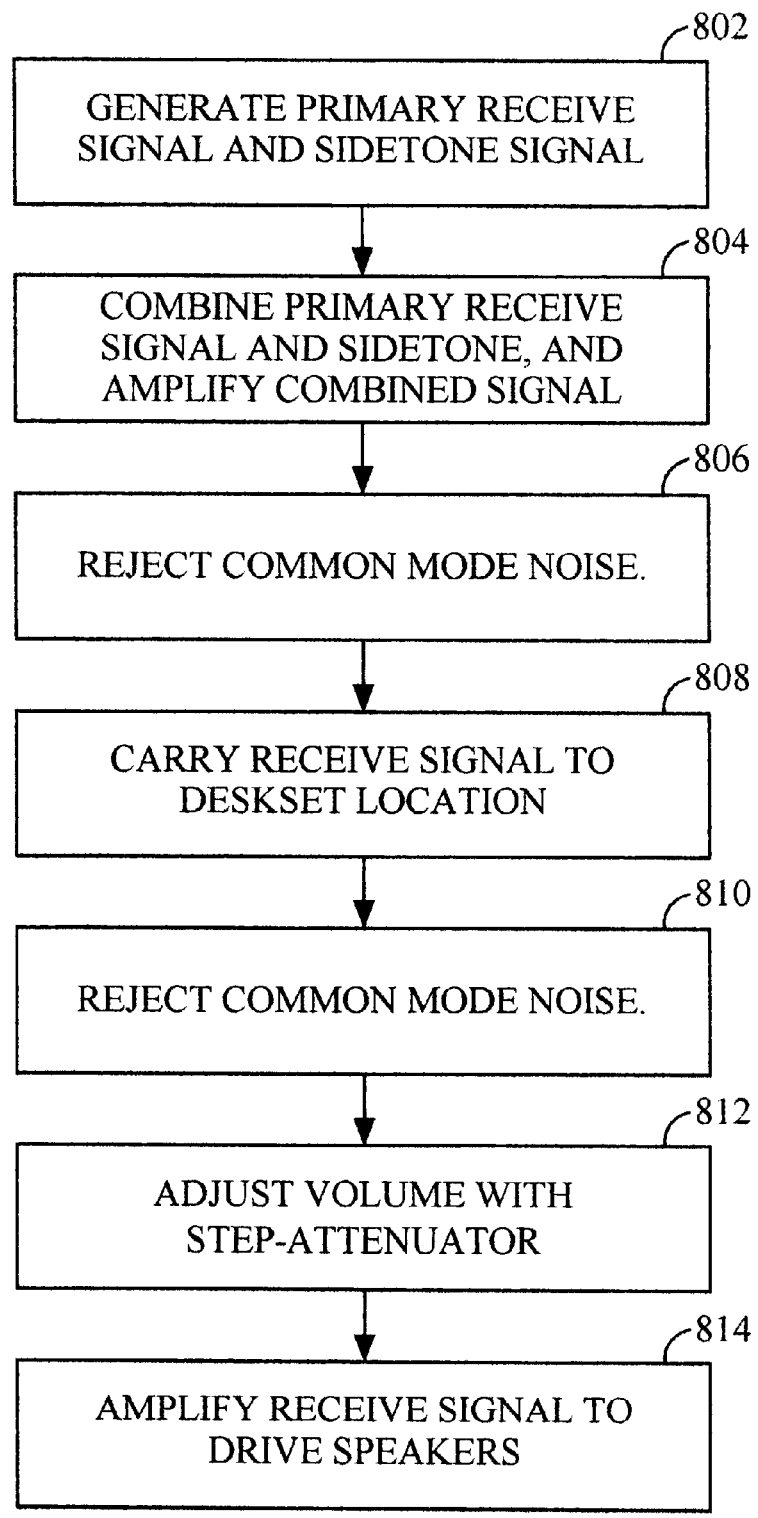
FIG. 8 is a flowchart of receive path operations.

FIG. 7 is an operational flowchart that illustrates the method of invention along transmit path 500. FIG. 8 is an operational flowchart that illustrates the method of invention along receive path 600. In the following section, the flowchart operations in FIGS. 7 and 8 are discussed with reference to the components illustrated in FIGS. 3 and 4, respectively.

A. Transmit Path

In step 702, bias circuit 330 biases microphone 336 to produce a differential transmit signal from an acoustic input. As seen in FIG. 3B, microphone 336 draws DC current from voltage supply $V_D$ 315 through resistors 338 and 340 into microphone terminal 352. Current then flows out terminal 354 through resistors 342 and 344 to ground. Resistors 342 and 344 effect a non-zero DC voltage at terminal 354, causing microphone 336 to operate with a floating ground. Thus, microphone 336 produces a differential transmit signal at terminals 352, 354 that flows to terminals 348, 350. The signal information is carried by the potential difference between the terminals 348, 350.

Bias circuit 330 also prevents single mode power supply noise from either $V_D$ 315 or ground from affecting the transmit signal. First, resistors 338 and 344 insulate the power supply from the transmit signal. Second, any single mode power supply noise not removed by resistors 338, 344 will be converted to common mode noise at terminals 348, 352. This is accomplished by choosing capacitor 346 such that the impedance at the noise frequency is small relative to resistors 340 and 342. Thus, single mode noise from $V_D$ 315 or ground will divide and appear as common mode noise at terminals 348, 350 instead of appearing as single mode noise at just one of the terminals 348, 350. The common mode noise will be subsequently reflected by amplifier 324.

In step 704, high pass filters 326, 328 reflect any low frequency background noise included in the transmit signal. Two filters are used because the transmit signal is a differential signal. The cutoff frequency is selected at approximately 200 Hz because there is minimal speech energy below 200 Hz, but potentially significant background noise.

Examples of background noise are wind or road noise, which can saturate amplifier 324 if the noise is not reflected. Wind noise often occurs when a deskset user inadvertently blows air into microphone 336 while speaking. Filters 326 and 328 prevent background noise energy below 200 Hz from saturating amplifier 324, which would prevent effective amplification of the desired speech energy above 200 Hz.

In step 706, amplifier 324 amplifies the transmit signal to drive transmit cable 204. In one embodiment, amplifier 324 is configured with a differential input and output, and thus only amplifies differential signals presented at it's input terminals. Thus, substantially all common mode signals are rejected.

In step 708, amplifier 324 and transformer 318 reject common mode noise. As stated above, amplifier 324 is configured with a differential input and only amplifies differential signals. Thus, amplifier 324 rejects any common mode noise imposed on the transmit signal by bias circuit 330 in step 702.

Furthermore, transformer 318 passes only differential signals and rejects common mode signals, which is typically an inherent feature of standard transformers. Thus, transformer 318 rejects any common mode noise generated after amplifier 324, including common mode noise generated by resistors 320 and 322, which are part of a summing amplifier discussed below.

In step 710, transmit cable 204 carries multiple transmit signals to RAU interface 208.

In step 712, transformer 402 rejects any common mode noise generated by transmit cable 204. Transmit cable 204 is a likely source of common mode noise when standard unshielded telephone cable is used, where the noise level increases with increasing cable length.

Figure 9A:
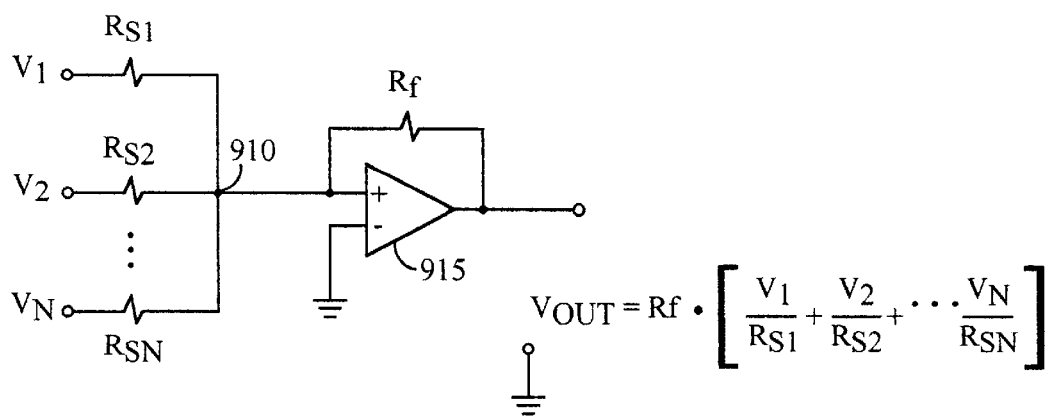
FIG. 9A is a diagram of an ideal summing amplifier.
Figure 9B:
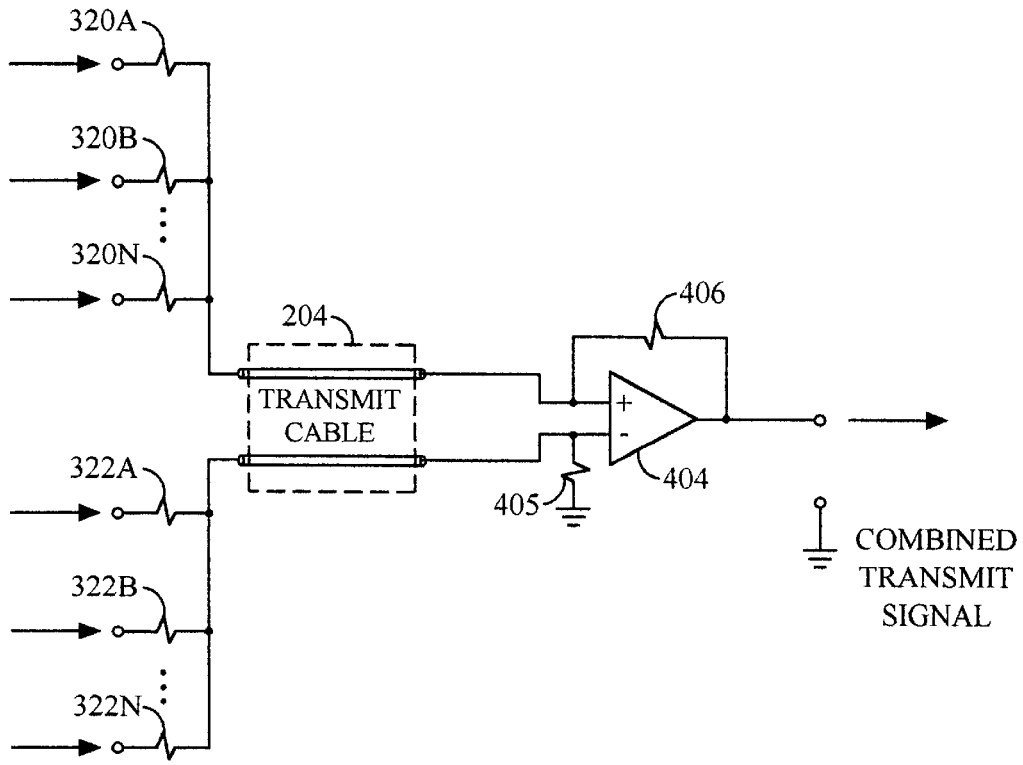
FIG. 9B is a diagram of an example embodiment of the transmit path summing amplifier.

In step 714, amplifier 404, transmit cable 204, and resistors 320, 322 operate as a summing amplifier for transmit path 500. A summing amplifier is used because multiple transmit signals are summed into one combined transmit signal before being presented to audio codec 428. FIGS. 9A and 9B will be used to illustrate the operation of the transmit summing amplifier. FIG. 9A illustrates an ideal summing amplifier, and FIG. 9B illustrates the summing amplifier implemented in the present invention.

As shown in FIG. 9A, the ideal summing amplifier comprises: a series resistor ($R_{S1}$, $R_{S2}$, ... $R_{SN}$) for each of the multiple signals ($V_1$, $V_2$, ... $V_N$) to be summed; a current node 910 at virtual ground to sum signal currents; and an amplifier 915 with a feedback resistor ($R_F$). The output voltage of the ideal summing amplifier is:

$$VOUT = R_F[V_1/R_{S1} + V_2/R_{S2} + \ldots + V_N/R_{SN}];$$

where the relative contribution to VOUT by the individual signal components may be weighted by adjusting the value of the individual series resistors. If the series resistors are all equal to $R_S$, then the gain of the summing amplifier is the ratio: $R_F/R_S$. A summing amplifier can be operated with unity gain if $R_F$ is chosen to be equal to $R_S$. A summing amplifier can be operated as a summing attenuator if $R_F$ is chosen to be smaller than RS.

FIG. 9B illustrates one embodiment of how the present invention implements a summing amplifier. Resistors 320a–n, 322a–n implement the series resistors $R_{S1}$–$R_{SN}$ depicted in FIG. 9A, and are located in representative deskset interface 202. The present invention uses two resistors 320, 322 for each corresponding series resistor $R_S$ in the ideal summing amplifier because the multiple transmit signals are differential signals. Amplifier 404 and resistors 405, 406 implement amplifier 915 and feedback resistor $R_F$ of FIG. 9A, respectively.

Transmit cable 204 implements current node 910 since transmit cable 204 is a low impedance connection between resistors 320a–n, 322a–n and amplifier 404. The non-zero length of transmit cable 204 does not hinder its effectiveness as current node because the length of transmit cable 204 is small relative to the wavelength of the audio frequency transmit signals.

In one embodiment, series resistors 320a–n, 322a–n have a value substantially equal to 3.92 KOhms, and the feedback resistors 405, 406 have a value substantially equal to 1 KOhms. This combination results in 8 dB of signal attenuation for the combined transmit signal produced by amplifier 404. Signal attention is necessary to prevent saturation of the following circuitry in RAU 104.

An advantage of locating series resistors 320, 322 in each deskset interface 202a–n (as opposed to RAU interface 208) is that the multiple driver amplifiers 324 are prevented from operating as current sinks to each other. Current sinking would occur since the driver amplifiers 324 are connected to each other by transmit cable 204, and each driver amplifier 324 has a typical low output impedance. Resistors 320, 322 provide the necessary output isolation to prevent the driver amplifiers 324 from acting as current sinks.

In one embodiment, low pass filter 408 shapes the frequency spectrum of the combined transmit signal before it is sent to audio codec 428. The cutoff frequency of low pass filter 408 is set to approximately 3.4 KHz because most speech energy is contained below 3.4 KHz. In an alternate embodiment, the cutoff frequency is set to approximately 3.0

KHz to counter any pre-emphasis of the speech energy above 2 kHz. Pre-emphasis can be beneficial to counter the effect of increasing attenuation with increasing frequency, but any excess should be removed from the combined transmit signal prior to audio codec 428. However, as those skilled in the art will readily understand, other cutoff frequencies can be selected.

In step 716, audio codec 428 digitizes the combined transmit signal and generates a sidetone signal for use by receive path 600. After which, vocoder 430 compresses the combined transmit signal to more efficiently utilize the transmission bandwidth of the carrier signal used to communicate with satellite 108. In one embodiment, a standard 64 Kbps signal rate typically used to represent human speech is reduced to a 4 Kbps signal rate.

In step 718, modulator 432 modulates a carrier signal with the compressed transmit signal and sends the modulated carrier signal to antenna 436. Antenna 436 radiates the modulated carrier signal to satellite 108, which is part of a larger satellite communications network 100.

As stated above, the present invention is, or resides in, audio interface 210 between desksets 102*a–n* and RAU 104. The audio interface is being described in terms of transmit path 500 and receive path 600, and comprises: deskset interfaces 202*a–n*, transmit cable 204, receive cable 206, and the RAU interface 208. RAU 104 components are not part of the audio interface, and are not necessary to practice the present invention. RAU 104 components and their functionality are described in steps 716 and 718 only to provide a more complete picture of the present invention's utility in a larger communications system 100. RAU components are well known to those skilled in art, as well as the techniques useful to manufacture RAU 104.

B. Receive Path

In step 802, audio codec 428, vocoder 430, and de-modulator 434 generate and submit the receive signal to RAU interface 208. The receive signal comprises the primary receive signal and the sidetone signal. In doing so, antenna 438 receives an input signal comprising a modulated carrier signal from satellite 108. De-modulator 424 demodulates the input signal resulting in a digital audio signal. Vocoder 430 de-compresses the digital audio signal and sends it to audio codec 428. Audio codec 428 forms the primary receive signal by converting the digital audio signal to an analog audio signal.

The primary receive signal is an audio signal with telephone conversation intended for deskset users. The primary receive signal is so named to distinguish it from the sidetone signal. The sidetone signal allows deskset users to hear their own voice(s) during a telephone call. In doing so, the sidetone signal assures the deskset users that a proper telephone connection has been made. Audio codec 428 generates the sidetone signal from the combined transmit signal before it is digitized. Audio codec 428 submits the primary receive signal and the sidetone signal to RAU interface 208.

In step 804, amplifier 412 and resistors 414, 416, and 418 operate as a receive summing amplifier to combine the primary receive signal and the sidetone signal into a single receive signal. Amplifier 412 is configured with a differential output causing the receive signal to be a differential signal.

The receive summing amplifier operates similar to the transmit summing amplifier described in transmit path step 714. The differences being that the sidetone signal is attenuated approximately 4 dB relative to the primary receive signal. This is done by selecting resistor 416 in the sidetone signal path to be larger than resistor 418. Also, the ratio of feedback resistor 414 to series resistors 416, 418 is chosen to provide gain for the receive signal instead of loss. This done because amplifier 430 also operates as a driver amplifier for receive cable 206.

In one embodiment, resistors 416 and 418 are substantially equal to 10 KOhms and 17 KOhms, respectively. These values assure that the resistors attenuate the sidetone signal by the desired 4 dB relative to the primary receive signal. Feedback resistor 414 is substantially equal to 56 KOhms, which results in 15 dB gain for the receive signal, and will adequately drive receive cable 206.

In step 806, transformer 410 rejects any common mode noise imposed on the receive signal prior to receive cable 206.

In step 808, receive cable 206 carries or transfers the receive signal to representative deskset interface 202.

In step 810, transformer 302 rejects any common mode noise generated by receive cable 206. Receive cable 206 is a likely source of common mode noise when standard unshielded telephone cable is used, where the noise level increases with increasing cable length. In one embodiment, transformer 302 is a standard audio transformer with characteristics that are identical to those of transformer 410.

In step 812, step attenuator 304 attenuates the receive signal to operate as a volume control for speaker 332 and handset receiver 334. Step attenuator 304 controls the volume by attenuating the receive signal in 5 dB increments. In one embodiment, attenuator 304 is controlled by a controller (not shown) at RAU 104 through a control bus (not shown). This allows RAU 104 to increase the volume when audio interface 104 is used as a ringer to announce an incoming call. In an alternate embodiment, attenuator 304 is controlled at the individual desksets using the deskset 102 keypad.

In step 814, amplifiers 306, 308 amplify the receive signal to drive speaker 332 and handset receiver 334, respectively. Amplifiers 306, 308 generally use op amps in a standard feedback arrangement to achieve a desired gain to drive speaker 332 and handset receiver 334, respectively. In one embodiment, amplifiers 306, 308 are built around LM 4862 op amps, which are commercially available from National Semiconductor. In one embodiment, speaker amplifier 306 is configured to provide 6 dB of gain, and handset amplifier 308 is configured to provide 5 dB of attenuation. The speaker amplifier gain level was chosen to make the ringer sufficiently loud when a new call is initially received at RAU 104.

C. DC Power Distribution

As discussed above, the primary role of transmit cable 204 is to carry transmit signals from deskset interfaces 202*a–n* to RAU interface 208. The primary role of receive cable 206 is to carry the receive signal from RAU interface 208 to deskset interfaces 202*a–n*.

Transmit and receive cables 204, 206 may also simultaneously carry DC power from RAU interface 208 to deskset interfaces 202*a–n*, or visa versa. This can occur because transmit and receive cables 204, 206 are DC isolated from each other. The transmit and receive cables 204, 206 are also DC isolated from components in representative deskset interface 202 and RAU interface 208 by transformers 302, 316, 402, 410.

In one embodiment, voltage supply $V_S$ 425 is generated at RAU 104 and distributed to the multiple deskset interfaces 202*a–n* using audio interface 210. As illustrated in FIG. 4, $V_S$ 425 is applied to the input terminal of DC booster 426. DC booster 426 raises the voltage level in preparation to be carried to representative deskset interface 202. Filter 424 removes any noise generated by the voltage supply 425.

Positive supply line 420 is connected to the secondary coil of transformer 410, which is connected to receive cable 206. Ground line 422 is connected to the secondary coil of transformer 402, which is connected to transmit cable 204. Transformers 410, 402 isolate the voltage on receive and transmit cables 206, 204 from the components in RAU interface 208 since the components are attached to the primary coils of transformers 410, 402.

Transmit and receive cables 204, 206 carry the DC voltage to representative deskset interface 202. Any power loss caused by the non-zero resistance of transmit and receive cables 204, 206 can be compensated for by adjusting DC booster 426. In the alternative, voltage regulator 314 compensates for the non-zero cable length and resistance.

As seen in FIG. 3, supply lines 310, 316 pick up the DC voltage from the receive and transmit cables 206, 204 at the secondary coils of transformers 302, 318. Similar to the RAU 208 interface, transformers 302, 318 isolate the voltage on the receive and transmit cables 206, 204 from the deskset interface components. Supply lines 310, 316 carry the DC voltage to voltage regulator 314. Voltage regulator 314 insures a constant output voltage $V_D$ 315, which can then be used as voltage supply for deskset interface 202 components. Diode 312 precedes voltage regulator 314 to protect against component damage that can occur if voltage polarity is reversed. A zener diode may be included across supply lines 310, 316 to clamp the line voltage.

In one embodiment, 12 volts is applied at RAU 104 and boosted to 24 volts by DC booster 426. Voltage regulator 314 adjusts the voltage 3.3 volts, which is then used for voltage supply $V_D$ 315.

IV. Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What we claim as our invention is:

1. An audio interface for a wireless communications system, comprising:
    a radio antenna unit (RAU), for receiving and transmitting radio signals, having an audio codec coupled thereto at a first location;
    a plurality of deskset phones disposed at one or more second locations, each deskset phone being coupled by cable to said audio codec and including a microphone for generating said transmit signal from an acoustic input generated at the first location;
    a transmit path comprising:
        a dedicated transmit cable for carrying a transmit signal from said deskset phones to said audio codec,
        a bias circuit coupled to the output of said microphone for providing the microphone with a floating ground and causing said transmit signal to be a differential audio signal, and for converting single mode power supply noise to common mode noise which is added to said transmit signal,
        an amplifier configured with a differential input and a differential output, coupled to the output of said bias circuit and the input of said dedicated transmit cable for amplifying said transmit signal and for rejecting said common mode noise, and
        a transformer coupled to the output of said dedicated transmit cable for rejecting common mode noise generated by said cable, and for passing said transmit signal to the audio codec; and
    a receive path comprising a dedicated receive cable electrically isolated from said dedicated transmit cable for carrying a receive signal from said audio codec to said deskset phones.

2. The audio interface of claim 1, wherein said audio interface provides an interface between multiple deskset phones and the audio codec, said transmit path further comprising a summing amplifier coupled to the output of said transformer for summing multiple transmit signals from said multiple deskset phones to form a combined transmit signal.

3. The audio interface of claim 2, wherein said summing amplifier sums currents of said multiple transmit signals, and comprises a second amplifier for amplifying said combined transmit signal, and multiple series resistors corresponding to said multiple desksets; wherein each resistor determines the relative weighting of each transmit signal in said combined transmit signal.

4. The audio interface of claim 3, wherein said multiple series resistors are located at said first location, and said second amplifier is located at said second location.

5. The audio interface of claim 3, further comprising a lowpass filter coupled to the output of said summing amplifier to tune the frequency response of the said transmit path.

6. The audio interface of claim 1, further comprising a high pass filter connected to the output of said bias circuit to prevent low frequency noise from saturating said first amplifier.

7. The audio interface of claim 1, further comprising a resonant cavity coupled to the microphone, that introduces a resonance to pre-emphasize said transmit signal.

8. An audio interface for a wireless communications system, comprising:
    a radio antenna unit (RAU), for receiving and transmitting radio signals, having an audio codec coupled thereto at a first location, wherein the audio codec generates a primary receive signal and a sidetone signal;
    a plurality of deskset phones disposed at one or more second locations, each deskset phone being coupled by cable to said audio codec;
    a transmit path comprising a dedicated transmit cable for carrying a transmit signal from said deskset phones to said audio codec; and
    a receive path comprising:
        a dedicated receive cable electrically isolated from said dedicated transmit cable for carrying a receive signal from said audio codec to said deskset phones,
        an amplifier coupled to the output of the audio codec and the input of said dedicated receive cable and configured as a weighted summer with a differential output for combining the primary receive signal and the sidetone signal into said receive signal, and amplifying said receive signal, and
        a transformer coupled to the output of said dedicated receive cable for rejecting any common mode noise generated by a said dedicated receive cable, and passing said receive signal.

9. The audio interface of claim 8, further comprising a second amplifier coupled to the output of said transformer for driving at least one speaker to convert said receive signal to sound energy at the first location.

10. The audio interface of claim 9, further comprising a step attenuator coupled to the output of said receive cable for controlling the volume of said receive signal sound energy.

11. A wireless communications system having a transmit path for providing an audio transmit interface, comprising:
   a radio antenna unit (RAU), for transmitting radio signals, having an audio codec coupled thereto at a first location;
   a plurality of deskset phones disposed at one or more second locations spaced from said first location, each deskset phone being coupled by cable to said audio codec; and
   each deskset phone having a microphone for producing a transmit signal from an acoustic input generated at the deskset phone, the transmit path comprising:
      a bias circuit coupled to the output of said microphone for providing the microphone with a floating ground and causing the transmit signal to be a differential signal, and for converting single mode power supply noise to common mode noise which is added to the transmit signal;
      an amplifier configured with a differential input and a differential output and coupled to the output of said bias circuit for amplifying the transmit signal and for rejecting said common mode noise;
      a dedicated transmit cable coupled to the output of said amplifier for carrying the transmit signal to the deskset phone; and
      a transformer coupled to the output of said dedicated transmit cable for rejecting common mode noise generated by said cable, and passing the transmit signal on to the audio codec.

12. The transmit path of claim 11, further comprising a high pass filter coupled to the output of said bias circuit to prevent low frequency noise from saturating said amplifier.

13. The transmit path of claim 11, further comprising a second transformer connected between said amplifier and said transmit cable for further reducing common mode noise.

14. A wireless communications system having a transmit path for providing an audio transmit interface, comprising:
   a radio antenna unit (RAU), for transmitting radio signals, having an audio codec coupled thereto at a first location;
   a plurality of deskset phones disposed at one or more second locations spaced from said first location, each deskset phone being coupled by cable to said audio codec; and
   each deskset phone having a microphone for producing a transmit signal from an acoustic input generated at the deskset phone, the transmit path comprising:
      a bias circuit coupled to the output of said microphone for providing the microphone with a floating ground and causing the transmit signal to be a differential signal, and for converting single mode power supply noise to common mode noise which is added to the transmit signal;
      an amplifier configured with a differential input and a differential output and coupled to the output of said bias circuit for amplifying the transmit signal and for rejecting said common mode noise;
      a dedicated transmit cable coupled to the output of said amplifier for carrying the transmit signal to the deskset phone;
      a transformer coupled to the output of said dedicated transmit cable for rejecting common mode noise generated by said cable, and passing the transmit signal on to the audio codec; and
      a summing amplifier coupled to the output of said transformer for summing multiple transmit signals from multiple deskset phones resulting in a combined transmit signal.

15. The transmit path of claim 14, wherein said summing amplifier sums currents of said multiple transmit signals, and comprises a second amplifier for amplifying said combined transmit signal, and multiple series resistors corresponding to said multiple desksets; wherein each resistor determines the relative weighting of each transmit signal in said combined transmit signal.

16. The transmit path of claim 15, wherein said multiple series resistors are located at said first location and coupled to the output of said amplifier, and said second amplifier is located at said second location.

17. A wireless communications system having a receive path for providing an audio receive interface, comprising:
   a radio antenna unit (RAU), for receiving radio signals, having an audio codec coupled thereto at a first location;
   a plurality of deskset phones at one or more second locations spaced from said first location, each deskset phone being coupled by cable to said audio codec, wherein the audio codec generates a primary receive signal and a sidetone signal, the receive path comprising:
      an amplifier coupled to the output of said audio codec configured as a weighted summer with a differential output for combining the primary receive signal and the sidetone signal into a receive signal, and amplifying said receive signal;
      a dedicated receive cable coupled to the output of said amplifier for carrying said receive signal from the second location to the first location; and
      a transformer coupled to the output of said dedicated receive cable for rejecting common mode noise generated by a said dedicated receive cable.

18. The receive path of claim 17, further comprising a second amplifier coupled to the output of said dedicated receive cable for driving at least one speaker to convert said receive signal to sound energy at the first location.

19. The receive path of claim 18, further comprising a step attenuator coupled to the input of said speaker for controlling the volume of said receive signal sound energy.

20. A wireless communications system audio transmit interface, comprising:
   a radio antenna unit (RAU), for receiving radio signals, having an audio codec coupled thereto at a first location;
   a plurality of deskset phones disposed at one or more second locations, each deskset phone being coupled by cable to said audio codec;
   each deskset phone having a microphone for producing a transmit signal from an acoustic input generated by the audio codec;
   means for biasing the microphone with a floating ground causing the transmit signal to be a differential transmit signal, and for converting single mode power supply noise to common mode noise imposed on the transmit signal;
   means for amplifying the transmit signal;
   means for rejecting said common mode noise imposed on the transmit signal; and
   means dedicated for carrying the transmit signal from the audio coded to the deskset phones.

21. The system of claim 20, further comprising means for filtering the frequency response of the transmit signal.

22. The system of claim 20, wherein said means for rejecting comprises at least one differential amplifier that rejects common mode inputs.

23. The system of claim 22, wherein said means for rejecting further comprises at least one transformer.

24. The system of claim 20, wherein said means for carrying further comprises means for carrying DC power from one of the first or second locations to the other location.

25. A wireless communications system audio transmit interface, comprising:

a radio antenna unit (RAU), for receiving radio signals, having an audio codec coupled thereto at a first location;

a plurality of deskset phones disposed at one or more second locations, each deskset phone being coupled by cable to said audio codec;

each deskset phone having a microphone for producing a transmit signal from an acoustic input generated by the audio codec;

means for biasing the microphone with a floating ground causing the transmit signal to be a differential transmit signal, and for converting single mode power supply noise to common mode noise imposed on the transmit signal;

means for amplifying the transmit signal;

means for rejecting said common mode noise imposed on the transmit signal;

means dedicated for carrying the transmit signal from the audio codec to the deskset phones; and means for summing multiple transmit signals from multiple desksets to form a combined transmit signal.

26. The system of claim 25, wherein said means for summing comprises an amplifier configured as a weighted summer, wherein multiple series resistors determine the relative weighting of said multiple transmit signals in said combined transmit signal.

27. A wireless communications system, comprising:

a radio antenna unit (RAU), for receiving radio signals, having an audio codec for generating a primary receive signal and a sidetone signal coupled thereto at a first location;

a plurality of deskset phones disposed at one or more second locations, each deskset phone being coupled by cable to said audio codec;

a combiner for combining the primary receive signal and the sidetone signal to form a receive signal;

an amplifier for amplifying said receive signal;

a receive signal carrier dedicated for carrying said receive signal from the audio codec to the deskset phones; and means for rejecting common mode noise generated by said combiner, said amplifier or said receive signal carrier.

28. The system of claim 27, wherein said means for rejecting common mode noise comprises at least one transformer.

29. The system of claim 27, further comprising means for driving at least one speaker to convert said receive signal to sound energy at the first location.

30. The system of claim 29, further comprising means for controlling the volume of said sound energy.

* * * * *